(12) United States Patent
Liardet et al.

(10) Patent No.: US 7,536,564 B2
(45) Date of Patent: May 19, 2009

(54) METHOD FOR ENCRYPTING A CALCULATION USING A MODULAR FUNCTION

(75) Inventors: Pierre-Yvan Liardet, Peynier (FR); Fabrice Romain, Aix en Provence (FR)

(73) Assignee: STMicroelectronics S.A., Montrouge (FR)

( * ) Notice: Subject to any disclaimer, the term of this patent is extended or adjusted under 35 U.S.C. 154(b) by 755 days.

(21) Appl. No.: 10/476,359

(22) PCT Filed: Apr. 29, 2002

(86) PCT No.: PCT/FR02/01491

§ 371 (c)(1),
(2), (4) Date: Oct. 30, 2003

(87) PCT Pub. No.: WO02/088934

PCT Pub. Date: Nov. 7, 2002

(65) Prior Publication Data

US 2004/0179680 A1    Sep. 16, 2004

(30) Foreign Application Priority Data

Apr. 30, 2001    (FR)    ................................. 01 05815

(51) Int. Cl.
*H04L 21/00*    (2006.01)

(52) U.S. Cl. ...................................................... 713/194
(58) Field of Classification Search .................. 713/194
See application file for complete search history.

(56) References Cited

U.S. PATENT DOCUMENTS

| 5,991,415 | A | * | 11/1999 | Shamir | ......................... 380/30 |
| 6,304,658 | B1 | | 10/2001 | Kocher et al. | |
| 6,408,075 | B1 | | 6/2002 | Ohki et al. | |
| 7,123,717 | B1 | * | 10/2006 | Coron et al. | ................... 380/28 |
| 2001/0002486 | A1 | | 5/2001 | Kocher et al. | |

OTHER PUBLICATIONS

International Search Report from the corresponding International Application No. PCT/FR02/01491, filed Apr. 19, 2002.

* cited by examiner

*Primary Examiner*—Andrew L Nalven
(74) *Attorney, Agent, or Firm*—Lisa K. Jorgenson; James H. Morris; Wolf, Greenfield & Sacks, P.C.

(57) ABSTRACT

The invention concerns a method for encrypting, with a random quantity (r), a calculation using at least a modular operation (3), the method consisting in multiplying a first modulo (n) by said random quantity, in taking as modulo of the operation, the result (m) of said multiplication and in carrying out a modular reduction of the result of the operation, on the basis of the first modulo (n).

12 Claims, 1 Drawing Sheet

METHOD FOR ENCRYPTING A CALCULATION USING A MODULAR FUNCTION

BACKGROUND OF THE INVENTION

1. Field of the Invention

The present invention relates to the protection of a secret key or datum (binary word) used in a process of authentication or identification of an electronic circuit (for example, a smart card) or the like, against piracy attempts. The present invention more specifically relates to the scrambling of calculations taking into account the secret datum. "Scrambling" designates a modification of the observable physical features (power consumption, thermal, electromagnetic radiation, etc.) induced by the operation of a component.

2. Discussion of the Related Art

An example of application of the present invention relates to a countermeasurement process against an attack by simple power analysis (SPA) or differential power analysis (DPA) of a digital processing circuit exploiting a private or secret datum. Such an attack by power analysis is an attack capable of being used by pirates to attempt discovering a digital key or the like. Such an attack consists of evaluating the direct or statistical dependence between the circuit power consumption and the use of digital data processed by a chip and involving a secret value. Indeed, in an algorithmic processing by means of a processing circuit, there exists a dependence between the circuit power consumption and the processed datum. The pirate uses the data input into the circuit, and thus "visible", and used by the algorithm, to determine the secret datum present in the circuit, by examining its power consumption upon execution of the algorithm.

To make attacks by differential power analysis more difficult, it is generally attempted to make the visible data independent from the processed data. "Visible data" designates the binary words input into the algorithmic processing circuit and extracted from this circuit. The actual calculation, which most influences the circuit power consumption, is then performed on a modified or scrambled datum.

Generally, a random value is used to convert the input datum into a scrambled datum involved in the calculation.

FIG. 1 shows, in the form of a very simplified flowchart, a conventional example of a method for processing a datum A input into an authentication chip by a calculation algorithm performing a modular operation. The inputting of datum A is symbolized in FIG. 1 by a block 1 (IN). Datum A is then converted into a datum A' (block 2) by a using a random value r. This conversion consists, for example, of applying an arithmetical operation to operands A and r. Datum A' is submitted to the calculation of the authentication function (block 3). This calculation consists of performing an operation $B'=f(A')$ modulo n, where function f represents a modular arithmetical operation. The size (number of bits) of the modulo n of this function is generally predetermined by the number of bits for which the processing circuit is provided. Indeed, the number of bits on which the operations are executed is generally sized according to the moduli used by these operations and to the maximum sizes of the operands and results.

In the more specific application of the present invention to a processing of an algorithm involving a secret datum s, this datum is contained in the chip (for example, permanently stored) and is provided to the algorithm in the calculation operation (block 3). The pirate attempts to detect this secret datum by analyzing the power consumption. Without the scrambling of datum A into datum A', this possible pirating is eased since the pirate knows the input datum A as well as the modulo n of the modular function.

A current example of a modular arithmetical function is the modular exponentiation which consists of applying the following formula:

$$B'=A'^s \text{ modulo } n.$$

Once result B' is obtained by the implementation of the calculation algorithm, this result is inversely converted to restore a datum B (block 4), which is provided (block 5, OUT) at the circuit output. Random amount r must be stored (block 6, MEM) between steps 2 and 4, to be used again upon the inverse conversion applied to the result of the algorithm.

A disadvantage of conventional scrambling methods implementing the algorithm operand is that they require additional computation power with respect to the mere execution of the algorithm. In particular, the conversion of B into B' requires as many resources (memory, calculation time, etc.) as the actual calculation of the function.

Another disadvantage of conventional processes is that the storing of random value r makes the countermeasurement process more vulnerable to an attack by examination of the circuit power consumption.

Further, the simple fact of having to store this random datum requires specific circuits taking up additional space.

EP-A-1006492 discloses a calculation method implementing a modular operation in which a random value is used at the end of the method. So, the random quantity must be stored.

WO-A-9852319 also discloses a calculation method in which a random quantity is used. This quantity is used in the modulo of the operation and must also be stored.

SUMMARY OF THE INVENTION

The present invention aims at providing a novel solution for scrambling a calculation involving at least one modular arithmetical operation, which requires less calculation resources than conventional solutions, and which avoids storage, during the entire calculation duration, of a random value involved in the scrambling.

To achieve these and other objects as well as others, the present invention provides a method for scrambling, by means of a random value, a calculation involving at least one modular operation, including multiplying a first modulo by said random value, taking as the modulo of the operation the result of this multiplication, and performing a modular reduction, based on the first modulo, of the result of the operation is performed.

According to an embodiment of the present invention, said operation involves at least one input datum as well as at least one secret datum.

According to an embodiment of the present invention, said secret datum is contained in an electronic circuit implementing the method.

According to an embodiment of the present invention, said input datum is a datum input into an electronic circuit implementing the method.

The invention also provides a processing circuit implementing this method.

The foregoing objects, features and advantages of the present invention will be discussed in detail in the following non-limiting description of specific embodiments in connection with the accompanying drawings, in which:

DETAILED DESCRIPTION

Figure 1:
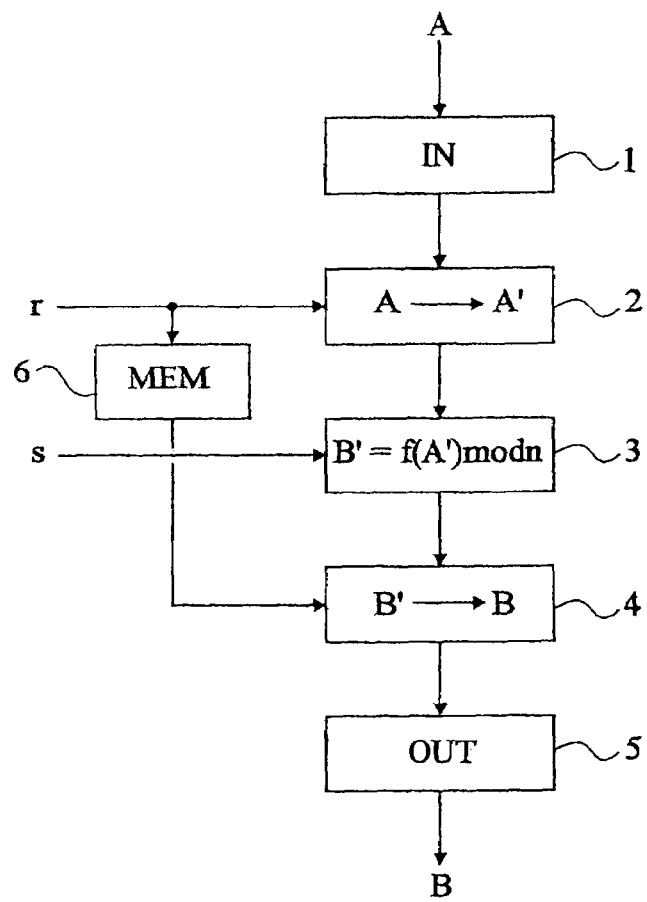
FIG. 1 illustrates in the form of a simplified flowchart the implementation of a calculation method involving an external datum scrambled according to the state of the art.

The same elements are designated with the same references in the different drawings. For clarity, only those steps of the scrambling and calculation method which are necessary to the understanding of the present invention have been illustrated in the drawings and will be described hereafter. In particular, the processings affecting the data have not been. The present invention applies whatever the downstream and upstream processings performed.

Figure 2:
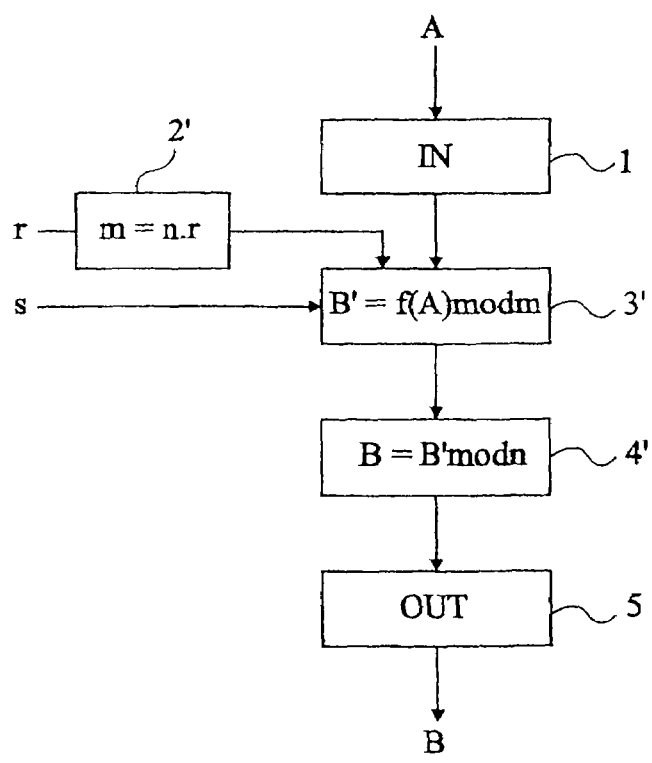
FIG. 2 illustrates in a very simplified flowchart an embodiment of the scrambling method according to the present invention.

FIG. 2 illustrates, in a simplified flowchart to be compared to that in FIG. 1, an embodiment of the method according to the present invention.

A feature of the present invention is to scramble, no longer operand A input from the outside (block 1, IN), but the modulo of the performed modular arithmetical operation.

Thus, according to the present invention, for a modulo-n modular function, a random integer r is drawn for each calculation and this random number is multiplied (block 2') to the modulo n. This then provides a number m, which, according to the present invention, is used as the modulo of the authentication calculation (block 3'). This calculation thus directly involves operand A and modified modulo m. The involved operation is not modified with respect to the conventional case. However, it can be seen that by affecting the modulo of the authentication algorithm, the respective values, and thus the circuit power consumption, are affected. The object of scrambling the calculation is thus achieved.

Result B'=f(A) modulo m must, as was previously the case (block 4, FIG. 1), be inversely converted.

However, according to the present invention, this inverse conversion (block 4', FIG. 2) is particularly simple. Indeed, since the modulo m used in the modular operation is a multiple of n (m=r.n), it is sufficient to reduce number B' modulo n to obtain result B to be provided (block 5, OUT) at the circuit output.

An advantage of the present invention is that such a modular reduction and the multiplicative operation of the modulo generates only a few calculations.

Another advantage of the present invention is that it is no longer necessary to store random value r for the inverse conversion. Random value r can then be deleted as soon as number m has been calculated (block 2'). The possible pirating of the secret datum s involved in the calculation is made even more difficult.

The scrambling or masking performed according to the present invention is particularly simple to implement. Account must simply be taken of the number of bits taken into account in the operations with the largest modulo, to size the number processing circuits.

For example, for a processing circuit conventionally performing a modular operation over 1024 bits, it can be provided to add 64 bits to the processed number. The 64 bits represent the size of the involved random value r.

In a specific application of the present invention to a modular exponentiation, the present invention has the particular advantage of considerably simplifying the calculations with respect to the conventional operand processing. Indeed, a modular exponentiation is generally implemented by a well known square multiplication technique including operating as many modular squares as there are bits of the exponent and as many products as there are bits at state 1 in the exponent.

Of course, the present invention is likely to have various alterations, modifications, and improvements which will readily occur to those skilled in the art. In particular, any dimensions may be chosen for numbers n and r. A compromise will generally be selected between the size of the modulo and the size of the random value. In practice, the size of the modulo is often determined by external imperatives (standards, etc.). The number of bits processed by the circuit is then slightly increased (according to the size chosen for the random value).

Further, the method according to the present invention may be combined with the conventional method for applications where calculation time can be sacrificed to increase the scrambling.

Further, it should be noted that the present invention more generally applies to any modular function (for example, addition, subtraction, multiplication, modular inversion, etc.) and whatever the numbers of calculated functions and of input/output data, its implementation being within the abilities of those skilled in the art based on the functional indications given hereabove. Reference may for example be made, for example, to work "Handbook of Applied Cryptography" by A. J. Menezes, P. C. van Oorschot, and S. A. Vanstone, published in 1997, CRC Press LLC (pages 297, 454 to 459 and 484) for so-called ELGAHAL and derived examples of algorithms, involving modular operations, to which the present invention applies.

Finally, the design and construction of a processing circuit implementing the calculation and scrambling method of the present invention is within the abilities of those skilled in the art based on the functional indications given hereabove. The implementation of the present invention only requires conventional means, be it a software implementation by a microcontroller or a hardware implementation by a wired logic state machine. The present invention, which has been described hereabove with reference to examples of number sizes indicated in bit form may of course be transposed to other bases, provided that the calculation means used accept such bases.

Having thus described at least one illustrative embodiment of the invention, various alterations, modifications, and improvements will readily occur to those skilled in the art. Such alterations, modifications, and improvements are intended to be within and scope of the invention. Accordingly, the foregoing description is by way of example only and is not as limiting. The invention is limited only as defined in the following claims and the equivalents thereto.

What is claimed is:

1. A method for scrambling, by means of a random value, a calculation involving a modular operation to be performed by an electronic circuit, the method comprising:
    accepting as an input to the electronic circuit at least one input datum;
    multiplying a first modulo by said random value to yield a product;
    performing the modular operation to yield a first result, the modular operation using as operands the product of the multiplication and the at least one input datum;
    performing a modular reduction, using the first modulo as an operand, of the first result of the modular operation, the modular reduction yielding a second result; and
    outputting, from the electronic circuit, the second result of the modular reduction.

2. The method of claim 1, wherein said modular operation involves the at least one input datum as well as at least one secret datum.

3. The method of claim 2 wherein said secret datum is contained in the electronic circuit implementing the method.

4. A circuit for scrambling a calculation performed by an integrated circuit, comprising:
   an input terminal adapted to receive an input value;
   a processing circuit adapted to perform processing steps on the value, the processing steps comprising
      multiplying a first modulo by said random value to yield a product,
      performing a modular operation to yield a first result using as operands the product of the multiplication and the value,
   performing a modular reduction, using the first modulo as an operand, of the first result of the modular operation, the modular reduction yielding a second result, and
      storing the second result as a result of the processing steps; and
   an output terminal adapted to output the result of the processing steps.

5. The circuit of claim 4, wherein the processing circuit is a microcontroller and the circuit further comprises at least one memory storing computer-executable instructions to be executed by the microcontroller.

6. The circuit of claim 4, wherein the processing circuit is a hard-wired logic state machine.

7. The circuit of claim 4, farther comprising at least one memory storing a secret datum.

8. A method of protecting a secret datum and an authentication calculation to be performed by an electronic circuit based at least in part on the secret datum, the method comprising:
   accepting as input to the electronic circuit an input value;
   determining a random value;
   multiplying a first value by the random value to calculate a first operand;
   performing the authentication calculation on the input value, the authentication calculation comprising a first modulo operation using the first operand as a divisor, the first modulo operation calculating a second operand;
   determining a result by performing a second modulo operation using the second operand as a dividend and the first value as a divisor; and outputting, from the electronic circuit, the result.

9. The method of claim 8, wherein the random value is determined by a pseudo-random process.

10. The method of claim 8, wherein the random value is only used in the act of multiplying.

11. The method of claim 8, further comprising clearing the random value from memory immediately following the act of multiplying.

12. The method of claim 8, wherein the authentication calculation comprises at least one operation involving the input value and a secret datum.

* * * * *

UNITED STATES PATENT AND TRADEMARK OFFICE
CERTIFICATE OF CORRECTION

PATENT NO. : 7,536,564 B2  Page 1 of 1
APPLICATION NO. : 10/476359
DATED : May 19, 2009
INVENTOR(S) : Pierre-Yvan Liardet et al.

It is certified that error appears in the above-identified patent and that said Letters Patent is hereby corrected as shown below:

On the title page, Item (75) should read:
(75) Inventors: Pierre-Yvan Liardet; Peynier, FR,
Fabrice Romain; Rians, FR Col. 2, line 44 should read:
To achieve these and other objects, the Col. 3, line 17 should read:
particular, the processings affecting the data have not been described in detail Col. 4, lines 48-49 should read:
intended to be within the spirit and scope of the invention. Accordingly, the foregoing description is by way of example only and is not intended Claim 7, col. 6, line 1 should read:
The circuit of claim 4, further comprising at least one Signed and Sealed this Sixth Day of July, 2010

David J. Kappos
*Director of the United States Patent and Trademark Office*